MAGNETIC CORE SHIFT REGISTER

Filed Jan. 11, 1962

INVENTOR
SIEGFRIED J. STROBL

BY William E. Cleaver

ATTORNEY

United States Patent Office 3,137,844
Patented June 16, 1964

3,137,844
MAGNETIC CORE SHIFT REGISTER

Siegfried J. Strobl, Center Square, Pa., assignor to Sperry Rand Corporation, New York, N.Y., a corporation of Delaware Filed Jan. 11, 1962, Ser. No. 165,556
9 Claims. (Cl. 340—174)

This invention relates to a magnetic data handling device, and more particularly to a magnetic core shift register.

In the operation of a shift register the information is advanced from one stage to the next so that at the end of a shaft step each stage has the information which was in the previous stage. Magnetic cores have been employed in magnetic shift registers and operate such that as a first core (having information stored therein) is switched from one state of magnetization to the other, a voltage is generated in the winding on this first core. The generated voltage provides transfer current through the winding on the next adjacent (second) core. This transfer current provides a magnetomotive force which switches the next adjacent core to the same state of magnetization from where the first core was switched. Hence, the information is shifted from one core to the next core.

When employing magnetic cores in a shift register some precaution must be taken to prevent the information from shifting more than one stage, or beyond more than one adjacent core, in response to a single shift pulse. Further, information must be prevented from shifting in a rearward direction to prior stages. In other words, when the second core is switched from one state of magnetization to the other state, the change in flux induces a voltage on the second winding of the second core. This last-mentioned induced voltage attempts to provide transfer current to the next adjacent core or the third core. If the transfer current is transmitted through the winding on the third core (in response to the second core being switched by switching the first core) then the third core is also switched in response to the first core being switched. Since the normal operation of a shift register requires shifting only one stage of the core in response to each single shift pulse (the second core in our example) then transmitting transfer current to the third core (in response to the shift pulse which shifted the second core) is undesirable. In order to prevent this erroneous shifting of information, some blocking means must be provided to block the transfer current passing to the third core and the cores beyond the third core.

In a somewhat similar fashion information can be erroneously transferred in a backward or rearward, direction, i.e., from an advanced stage to a prior stage, and therefore precaution must be taken to block transfer current which would be transmitted from an advanced stage to a prior stage.

Accordingly, it is an object of the present invention to provide an improved magnetic core shift register.

It is a further object of the present invention to provide a magnetic core shift register which prevents erroneous shifting of information while employing relatively few components to accomplish this operation.

It is another object of the present invention to provide a magnetic core shift register which provides transfer current to a plurality of cores but minimizes the accumulative amount of this current through the driving means.

In accordance with a feature of the present invention a transistor is provided as a switching current generating means and is further employed as a high impedance to spuriously-generated transfer current in both the advanced and backward directions.

In accordance with another feature of the present invention a transformer is employed to couple a switching current transistor to the cores. The transformer enables a large amount of transfer current due to many stages to be transmitted without passing the same through the switching current transistor.

The above-mentioned and other features and objects of this invention will become more apparent by reference to the following description of an embodiment of the invention taken in conjunction with the accompanying drawings wherein.

Figure 1:
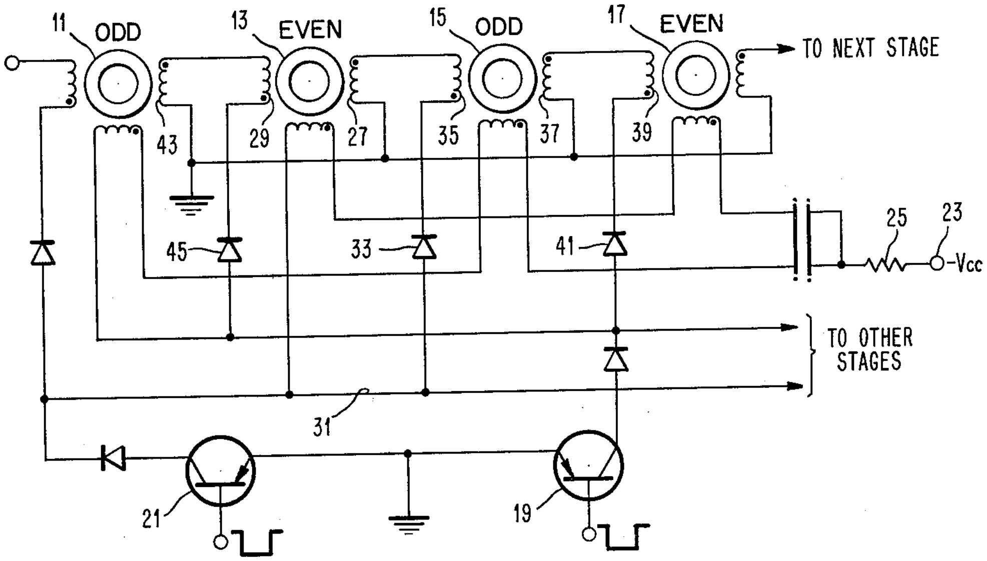
FIGURE 1 is a schematic of one embodiment of the present invention.

Consider first FIGURE 1 wherein there are shown four cores 11, 13, 15 and 17. Although only four cores are shown it is to be clearly understood that the shift register could be any particular size and involve any number of cores.

It will be noted in FIGURE 1 that the cores 11 and 15 are designated as "ODD" cores, while cores 13 and 17 are designated as "EVEN" cores. Each of the cores 11, 13, 15 and 17 has three windings thereon. There is a primary winding, and a secondary winding, as well as a drive winding. On each of the windings there is designated a dot which follow the usual dot convention; i.e. when the dot end of the drive winding is acting with a positive polarity then the dot ends of each of the windings with which the drive winding is associated also provides a positive polarity.

The switching current transistor 19 has its collector connected in series with the drive windings of all the ODD cores and in FIGURE 1, specifically, to the ODD cores 11 and 15. The other side of the ODD drive windings are connected to a minus potential source 23 through a resistor 25. In a similar fashion the switching current transistor 21 is connected from its collector in series with the drive windings of all the EVEN cores and in FIGURE 1, specifically, to the cores 13 and 17. The other side of the EVEN drive windings is connected to the minus voltage potential 23 through the resistor 25.

In order to fully describe the operation of the embodiment of the invention shown in FIGURE 1, consider that there is a binary one stored in core 13 (and binary zeros stored in the other cores) and this information is to be shifted to core 15 in response to a shift pulse. The shift pulse is transmitted to the base of the switching current transistor 21 in the form of a negative pulse. The negative pulse applied to the base of the transistor 21 turns on this transistor and current conducts through the drive windings on all of the EVEN cores, particularly core 13 and core 17 in FIGURE 1, through the resistor 25 to the minus voltage potential 23. In response to the switching current transmitted through the EVEN drive windings, the cores 13 and 17 are driven toward the "0" state of magnetization.

In our example we assumed that the core 17 had a binary "0" stored therein initially, and therefore there has been no change in flux by the attempt to switch the core 17 to its "0" state of magnetization. However, it was further assumed that the core 13 had a binary "1" stored therein and therefore there is a change of flux as the core 13 is switched from the "1" state of magnetization to the "0" state of magnetization. The change of flux in the core 13 induces a voltage in the windings 27 and 29.

Consider first the voltage induced in the winding 27. The dotted end of the drive winding is of negative potential when switching current is generated. Accordingly the dot convention indicates that the dot end of the winding 27 will be of negative potential and there will be transfer current transmitted from the non-dotted end of the winding 27, through ground, through the emitter of the transistor 21 to the collector thereof, along the line 31, through the diode 33, through the winding 35 to the dotted end of the winding 27. As this transfer current passes through the winding 35 there is a magnetomotive force produced in the core 15 which switches the core 15 from its "0" state of magnetization to the "1" state of magnetization, thereby transferring the information from the core 13 to the core 15.

As the core 15 switches from the "0" state of magnetization to the "1" state of magnetization, there is a voltage induced in the winding 37. In accordance with the dot convention the dotted end of the winding 37 will become positive polarity and an effort is made to transmit transfer current from the dotted end of winding 37, through the winding 39, through the diode 41, through the transistor 19 and back to the non-dotted end of the winding 37. However, this current path has high impedances therein: first, the diode 41, and secondly, the transistor 19. Therefore this spurious transfer current is blocked and hence the core 17 is not erroneously transferred from one state of magnetization to the other.

Consider now the voltage which is induced in the winding 29, when the core 13 was originally transferred from one state of magnetization to the other. In accordance with the dot convention the non-dotted end of the winding 29 is at positive polarity and therefore there is an effort to drive transfer current from the non-dotted end of winding 29, through the winding 43, through ground, through the emitter of the transistor 19, through the collector thereof, through the diode 45 to the dotted end of winding 29. Transistor 19 provides a high impedance for this current path and therefore this spurious transfer current, which would act to erroneously transfer the core 11 from one state of magnetization to another, is blocked.

It becomes apparent that each of the driving current transistors (switching current transistor), not only acts to drive the cores to effect a shifting operation but also acts as a high impedance to spurious transfer currents when they are produced in the system. The transistor 19 acts to generate current to switch the ODD cores and acts as a high impedance to spurious transfer current generated by the ODD cores, while the transistor 21 acts to generate current to switch the EVEN cores and provide high impedance to spurious transfer current produced by the EVEN cores.

Figure 2:
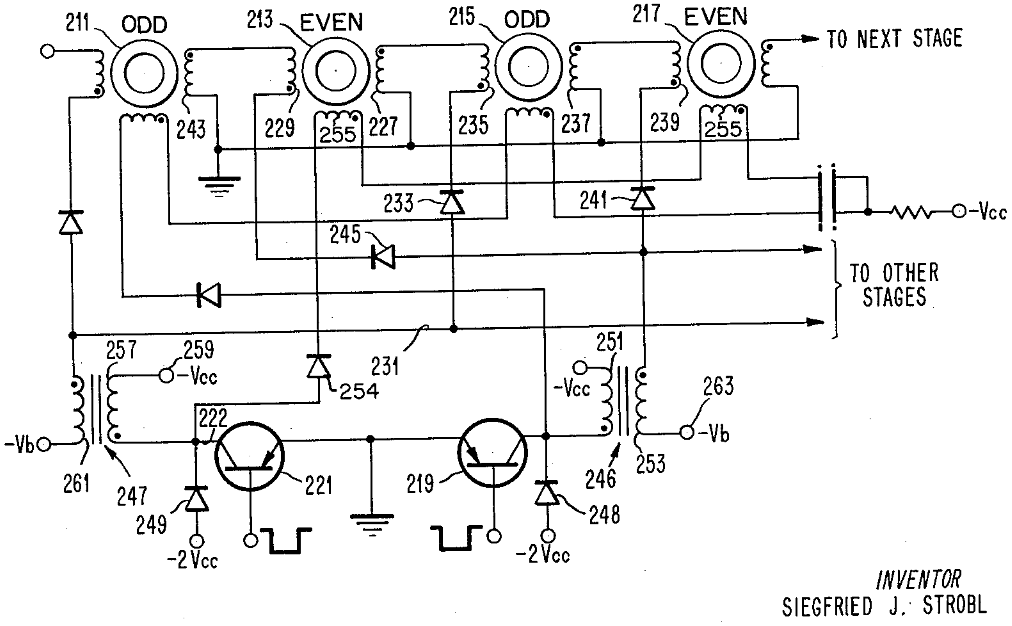
FIGURE 2 is a schematic of the second embodiment of the present invention.

Consider now FIGURE 2 which is a schematic of a second embodiment of the present invention. The components in the schematic of FIGURE 2 will be numbered the same as the components in FIGURE 1 excepting they will be preceded by the numeral 2 indicating they are in FIGURE 2. In FIGURE 2 there are shown the four cores 211, 213, 215, and 217. The circuitry throughout is identical to that in FIGURE 1 with the exception of the transformers 246, and 247 which couple the transistors 219 and 221, respectively, to the ODD core transfer loops and the EVEN core transfer loops. In addition there are two clamp circuits 248 and 249 which serve to clamp the collectors of the respective transistors 219 and 221. The transformers 246 and 247 each has a ratio $n$:1 between its primary side and its secondary side. If the ratio were 10:1 and there were a ten volt potential developed across the primary side there would be a one volt potential developed across the secondary side and, therefore, there will be $\frac{1}{10}$ times as much current in the primary as there is in the secondary. By virtue of this voltage step-down transformer the transfer current which passes through the secondary generates a current in the primary equal to $1/n$ of this transfer current, thereby enabling a transistor with less current capacity to be used.

In order to understand the operation of the embodiment shown in FIGURE 2 once again assume that there is a binary "1" stored in the EVEN core 213 and that each of the other cores 211, 215, and 217 has a binary "0" stored therein. A shift pulse or clock pulse is transmitted to the transistor 221 to provide switching current through diode 254 or drive current, through the windings 255 one of which is coupled to the core 213. As the drive current is transmitted through the core 213, the core 213 is switched from its "1" state of magnetization to its "0" state of magnetization. The change in the state of magnetization (change in flux) in the core 213 generates or induces a voltage in the winding 227 and in the winding 229.

Consider first the voltage induced in the winding 227. Since the non-dotted end of the winding 255 was at positive potential it follows that the non-dotted end of the winding 227 has a positive potential thereat. When the switching current is transmitted from the transistor 221, part of the current from the collector 222 is also transmitted through the primary winding 257 of the transformer 247 to the minus potential source 259. The parameters of the circuit are chosen such that the voltage induced in the secondary 261, in response to the current flowing through the primary 257, is sufficient to cancel the minus bias $-Vb$, so that the secondary winding 261 appears to be at ground potential. Therefore with positive polarity being at the non-dotted end of the winding 227 there is transfer current from the non-dotted end of the winding 227, through ground, through the secondary 261, along the line 231, through the diode 233, through the winding 235 to the dotted end of the winding 227. The current flowing through the winding 235 transfers the core 215 to its "1" state of magnetization thereby transferring the information from the core 213 to the core 215. The voltage $-Vb$ has an absolute value larger than the peak voltage of a core output which insures that the diodes in the transfer loops are backbiased to spurious current.

As the core 215 is transferred from its "0" state of magnetization to its "1" state of magnetization, there is a voltage induced in the winding 237. Since the dotted end of the winding 235 is at positive polarity when the transfer current flows therethrough it follows that the dotted end of the winding 237 is also at positive polarity. Therefore there is an effort to pass transfer current from the dotted end of the winding 237, through the winding 239, through the diode 241 in the reverse direction, through the secondary winding 253 of the transformer 246 to the minus voltage potential source 263. However, there is a large impedance in the form of the backbiased diode 241 opposing such current flow and therefore there is no spurious transfer current flowing in the loop to erroneously switch the core 217.

Consider now the voltage that was induced in the winding 229. In accordance with the dotted end convention the non-dotted end of the winding 229 is at positive polarity and therefore there is an effort to conduct current flow through the winding 243 to ground, through the secondary 253 of transformer 245, through the diode 245 to the dotted end of the winding 229. However since the voltage $-Vb$ has a greater absolute value than the highest output of a switched core, the diode 245 is reverse biased and therefore there is no current flow through the loop just described. Hence any erroneous switching of the core 211 to its other state of magnetization is prevented.

By employing the transformer as a means of coupling the driving transistor to the transfer windings the transfer current is conducted entirely through an independent loop and a fraction $1/n$ of the transfer current passes through the driving transistor. The driving transistor simply overcomes the bias on the transfer loop and allows the induced transfer current to be transmitted therethrough. The transformer 247 operates identically to the transformer 246, excepting that it is employed with the transfer loops of different cores.

It becomes apparent that the present invention provides a means for a magnetic core shift register which prevents erroneous shifting in either the advanced or the backward directions and yet employs fewer components because the transfer loop current is transmitted through the switching element and the loop is biased by the switching element. The switching circuits serve as high impedances to block spurious transfer current so that there need not be extra components supplied to provide these blocking measures.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. A magnetic core shift register comprising:
at least a first,
a second and a third magnetizable core,
each capable of being magnetized in first and second states of magnetization;
first current driving means including a high impedance therewith coupled to drive said first and third cores to a first state of magnetization;
second current driving means coupled to drive said second core to a first state of magnetization;
first transfer circuit means coupling said first core to said second core and coupled to said first current driving means;
said first transfer circuit generating transfer voltage in response to said second core being driven from said second state of magnetization to said first state of magnetization,
said transfer voltage attempting to generate transfer current to drive said first core from one state of magnetization to the other state of magnetization;
second transfer circuit means coupling said second core to said third core and coupled to said second current driving means,
said second transfer circuit generating transfer current in response to said second core being driven from said second state of magnetization to said first state of magnetization to switch said third core to said second state of magnetization,
said first current driving means passively enabling said high impedance to block the transfer current which would be generated in said first transfer circuit thereby preventing said first core from being erroneously switched to another state of magnetization in response to said second core being switched from said second state of magnetization.

2. A magnetic core shift register comprising:
at least a first,
a second,
and a third magnetizable core,
each capable of being magnetized in first and second states of magnetization;
first current driving means coupled to drive said first and third cores to a first state of magnetization;
second current driving means including a high impedance therewith coupled to drive said second core to a first state of magnetization;
first transfer circuit means coupling said first core to said second core and coupled to said first current driving means;
said first transfer circuit generating transfer current in response to said first core being driven from said second state of magnetization to said first state of magnetization,
said transfer current acting to drive said second core from said first state of magnetization to said second state of magnetization;
second transfer circuit means coupling said second core to said third core and coupled to said second current driving means,
said second current driving means passively enabling said high impedance to block the transfer current which would be generated when said second core is driven from said first state of magnetization thereby preventing said third core from being erroneously switched to another state of magnetization in response to said first core being switched from said second state of magnetization.

3. A magnetic core shift register comprising:
at least a first,
a second,
a third,
and a fourth magnetizable core each capable of being magnetized in first and second states of magnetization;
first current driving means including a high impedance therewith coupled to drive said first and third cores to a first state of magnetization;
second current driving means coupled to drive said second and fourth cores to a first state of magnetization;
first transfer circuit means coupling said first core to said second core and coupled to said first current driving means,
said first transfer circuit generating transfer voltage in response to said second core being driven from said second state of magnetization,
said transfer voltage attempting to drive transfer current to switch said first core from one state of magnetization to the other state of magnetization;
second transfer circuit means coupling said second core to said third core;
third transfer circuit means coupling said third core to said fourth core and coupled to said first current driving means including said high impedance,
said second transfer circuit generating transfer current in response to said second core being driven from said second state of magnetization to said first state of magnetization,
said transfer current acting to drive said third core from said first state of magnetization to said second state of magnetization;
said third transfer circuit generating transfer voltage in response to said third core being driven from said first state of magnetization to said second state of magnetization,
said last-mentioned transfer voltage attempting to drive transfer current to switch said fourth core from one state of magnetization to the other state of magnetization;
said first current driving means passively enabling said high impedance to block the transfer current which is generated in both said first transfer circuit and in said third transfer circuit when said second core is driven from said first state of magnetization thereby preventing both said first core and said fourth core from being erroneously switched from one state of magnetization to another state of magnetization in response to said second core being switched from said second state of magnetization.

4. A magnetic core shift register according to claim 3 wherein each of said first,
said second,
and said third transfer circuits means each includes a unidirectional current conducting device to block current which would be generated by the switching of a prior core from said first state of magnetization to said second state of magnetization.

5. A magnetic core shift register according to claim 3 wherein said first current driving means including said high impedance comprises a transformer;
and a transistor whose collector is coupled to the primary of said transformer while the secondary of said transformer is directly connected to the respective first and third transfer circuits.

6. A magnetic core shift register comprising:
at least a first,
a second,
a third,
and a fourth magnetizable core each capable of being magnetized in first and second states of magnetization;
first current driving means coupled to drive said first and third cores to said first state of magnetization;
second current driving means coupled to drive said second and fourth cores to said first state of magnetization;
first transfer circuit means coupling said first core to said second core and coupled to the said first current driving means,
said first transfer circuit generating transfer voltage in response to said second core being driven from said second state of magnetization,
said transfer voltage attempting to drive transfer current to switch said first core from one state of magnetization to the other state of magnetization;
second transfer circuit means coupling said second core to said third core,
third transfer circuit means coupling said third core to said fourth core and coupled to said first current driving means,
said second transfer circuit generating transfer voltage in response to said second core being driven from said second state of magnetization to said first state of magnetization,
said transfer voltage driving transfer current to switch said third core from said first state of magnetization to said second state of magnetization;
said third transfer circuit generating transfer voltage in response to said third core being driven from said first state of magnetization to said second state of magnetization,
said last-mentioned transfer voltage attempting to drive transfer current to switch said fourth core from one state of magnetization to the other state of magnetization;
said first current means providing a high impedance to transfer current which is generated in both said first transfer circuit and in said third transfer circuit when said second core is driven from said first state of magnetization thereby preventing both said first core and said fourth core from being erroneously switched from one state of magnetization to another state of magnetization in response to said second core being switched from said second state of magnetization.

7. A magnetic core shift register comprising:
a plurality of magnetizable cores capable of being magnetized in first and second states of magnetization and arranged as a register with every other core being respectively identified as ODD and EVEN;
first current driving means coupled to drive every ODD core to said first state of magnetization in response to a driving pulse applied thereto;
second current driving means coupled to drive every EVEN core to said second state of magnetization in response to a driving pulse applied thereto;
a plurality of first and second transfer circuits;
each of said first transfer circuits coupling an associated ODD core to its next adjacent EVEN core,
and each of said second transfer circuits coupling an associated EVEN core to its next adjacent ODD core;
each of said first transfer circuits individually looped connected through said first current driving means to transmit transfer current therethrough in response to its associated ODD core being driven from said second state of magnetization to said first state of magnetization,
said first current driving means providing a high impedance to transfer current which is generated when said EVEN cores are driven from said first state of magnetization to said second state of magnetization;
each of said second transfer circuits individually looped-connected through said second current driving means to transmit transfer current therethrough in response to its associated EVEN core being driven from said second state of magnetization to said first state of magnetization,
said second current driving means providing a high impedance to transfer current which is generated when said ODD cores are driven from a first state of magnetization to said second state of magnetization;
and said shift register operating such that when a core is driven from said second state of magnetization to said first state of magnetization only the next adjacent advanced core is driven from said first state of magnetization to said second state of magnetization.

8. A magnetic core shift register according to claim 7 wherein each of said first and second current driving means are respectively transistors.

9. A magnetic core shift register according to claim 7 wherein there is further included in each transfer circuit a unidirectional current conducting device which operates to further block the transfer current generated in response to its associated rearward core being switched in response to information being transferred there,
and to isolate one transfer circuit from another.

No references cited.